April 22, 1969　　　S. A. JONES ET AL　　　3,439,662
VARIABLY TIMED BRAKE FOR AN AUTOMOTIVE VEHICLE ENGINE
Filed Sept. 18, 1967
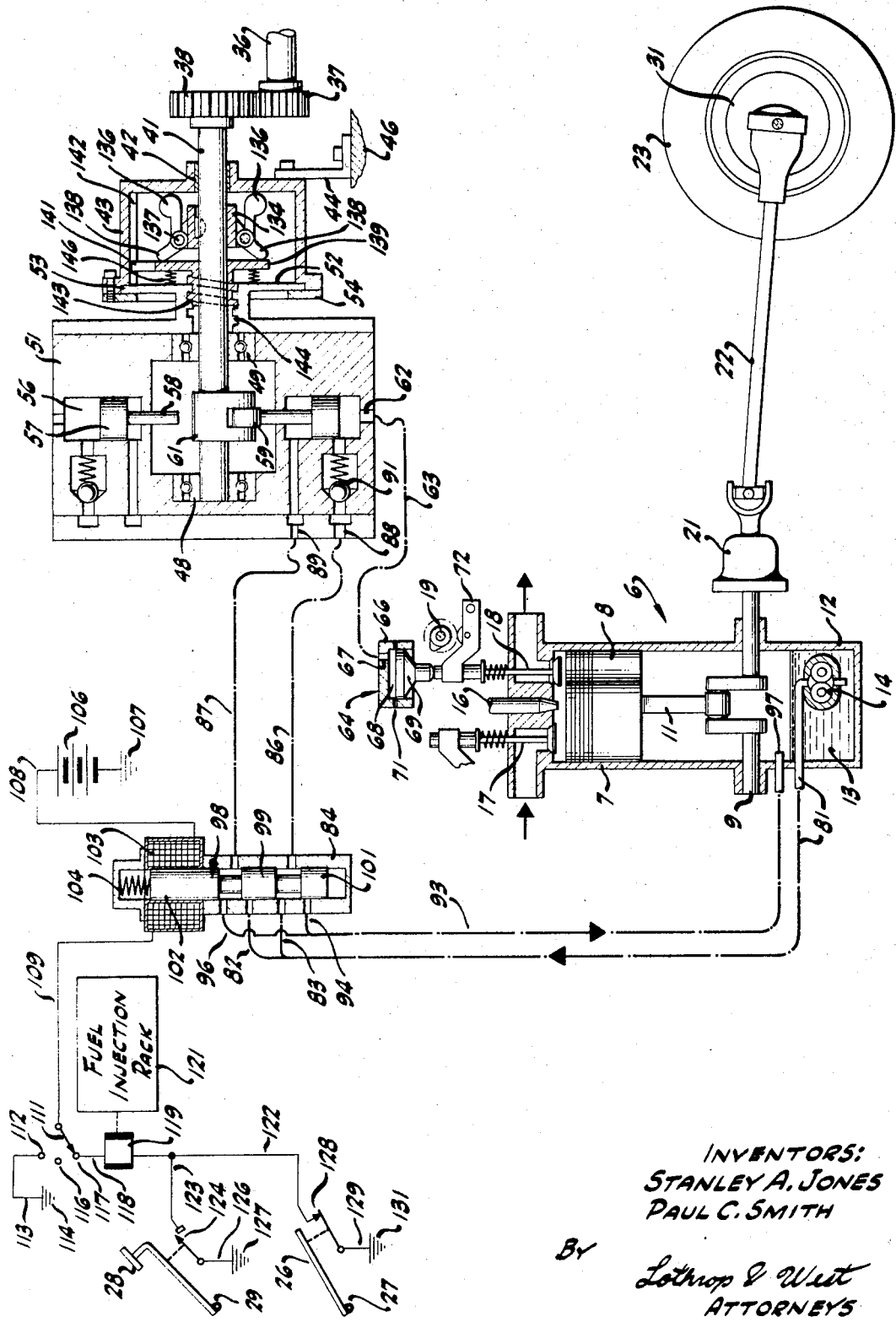
INVENTORS:
STANLEY A. JONES
PAUL C. SMITH
BY
Lothrop & West
ATTORNEYS United States Patent Office 3,439,662
Patented Apr. 22, 1969

3,439,662
VARIABLY TIMED BRAKE FOR AN AUTOMOTIVE
VEHICLE ENGINE
Stanley A. Jones and Paul C. Smith, Sacramento, Calif., assignors of fifty percent to Stanley A. Jones, twenty-five percent to Paul C. Smith, twelve and one-half percent to Dennis H. Fletcher, all of Sacramento, Calif., and twelve and one-half percent to Alan B. Jones, Fair Oaks, Calif.
Filed Sept. 18, 1967, Ser. No. 668,400
Int. Cl. F02d *31/00;* F01l *1/00;* B60k *27/00*
U.S. Cl. 123—97                       5 Claims

ABSTRACT OF THE DISCLOSURE

This invention relates to a variably timed braking mechanism for an automotive vehicle engine having a crank shaft and a periodically operated poppet exhaust valve and includes a mechanically driven piston pump hydraulically connected to a responsive expansible cylinder effective to afford timed operation of the engine exhaust valve in addition to the normal mechanical operation of such valve. The pump is driven from the automotive vehicle engine by a means which includes a flyball governor responsive to engine speed and effective to vary the angularity or phase relationship of the drive shaft to the pump so that the timing of the hydraulically operated exhaust valve mechanism is varied in accordance with speed variations of the automotive vehicle engine.

---

Our invention relates to means which may be built into or attached to an automotive engine installed in a vehicle, particularly in a tractor or truck normally operated over undulatory terrain in which the automotive vehicle engine is utilized as a brake. Particularly in connection with the operation of diesel engine trucks, for example, the downhill braking of the vehicle is sometimes augmented by an auxiliary device applied to the engine for opening the exhaust valves of the engine cylinders in time with the operation of the engine but out of phase with the ordinary four-stroke cycle operation. That is, the auxiliary exhaust valve operating mechanism is effective to open the exhaust valve at the beginning of the power stroke or at the end of the normal compression stroke, there being no fuel injection into the engine at this time. The effect is to convert the engine into an air compressor for the normal intake and compression cycles, and the added resistance of compressing the air without subsequent expansion within the cylinder adds to the engine retarding effect during downhill operations. The same braking effect is, of course, available for slowing the vehicle under any circumstances and is preferably put under the control of the vehicle operator for use by him in addition to his use of the ordinary friction wheel brakes.

Since the mechanism for utilizing the engine as a brake is in general well known, it is a particular object of the present invention to provide such a mechanism which has its braking response related to the speed of operation of the automotive vehicle engine.

Another object of the invention is to provide an improved and more effective automotive vehicle engine brake structure.

An additional object of the invention is to provide a variably timed brake for an automotive vehicle engine which can readily be installed thereon and can be coupled to the other existing facilities in the vehicle for an improved over-all operation.

A further object of the invention is to provide a variably timed brake for an automotive vehicle that produces a smooth and predetermined response depending upon the speed of the automotive vehicle engine.

Another object of the invention is in general to provide an improved brake for an automotive vehicle engine.

Other objects together with the foregoing are attained in the embodiment of the invention described in the accompanying description and illustrated in the accompanying drawing, in which:

The figure is a diagrammatic or schematic view showing the preferred form of variably timed brake pursuant to the invention with certain parts being shown representationally and other parts being shown by the diagrammatic representation.

While the mechanism of our invention can be embodied in a number of different ways, it has preferably been embodied as set forth herein. In this instance the mechanism includes an automotive vehicle engine 6 inclusive of a cylinder 7 within which a piston 8 can reciprocate pursuant to its connection to a rotary crank shaft 9 by means of a connecting rod 11. The engine has the customary oil sump 12 in which hydraulic liquid 13 such as lubricating oil is contained as in a reservoir and in which an oil pump 14 is disposed. The oil pump can readily be connected to and be driven by the crank shaft 9.

The engine is preferably of the sort operating on the diesel cycle, and hence in the head of the cylinder 7 includes an injector 16 for diesel fuel and also includes the customary inlet poppet valve 17 and the customary exhaust poppet valve 18. The valves are driven from the crank shaft 9 by one or more cam shafts 19 connected to the crank shaft 9 in the customary fashion. In this way both of the valves 17 and 18 are operated in timed sequence with the rotation of the crank shaft 9.

The engine is connected by a suitable intermediate transmission mechanism 21 and through a drive shaft 22 to the ground-engaging wheels 23 of the vehicle in which the engine is installed. All of this is customary installation in the vehicle. The vehicle can readily be controlled by the driver by means of a foot regulator 26 of the usual kind which has a connection 27 to a fuel injection means (not shown) joined to the injector 16 for controlling the amount of fuel consumed by the engine. Also, a brake pedal 28 is convenient to the vehicle operator and has a connection 29 to the customary friction brake mechanism 31 on the vehicle wheels 23. Again, the foregoing is standard construction.

Particularly pursuant to the present arrangement, the crank shaft 9 or the cam shaft 19 are connected to a driving shaft 36 is such a fashion that the shaft 36 operates in synchronism with the engine rotation. The shaft 36, for example, through gears 37 and 38 likewise rotates a pump shaft 41 in sychronism with the engine. The pump shaft is journalled in a bearing 42 in a governor housing 43 which is joined by a connection 44 to a stationary part 46 of the vehicle or of the engine. Mounted on the pump shaft 41 by bearings 48 and 49 is a pump housing 51. Because of the bearing mounting the pump housing 51, entirely coaxial with the pump shaft 41, can rotate with respect to the shaft and with respect to the governor housing 43. In fact, the relationship of the pump housing 51 and of the governor housing 43 is that of relative rotation because the pump housing has an extended flange wall 52 journalled in a bearing groove 53 formed in the governor housing 43 and having a cover plate 54 thereon.

Within the pump housing 51 are radially arranged cylinders 56 the same in number as the number of exhaust valves to be actuated on the engine 6. Within the cylinders 56 are disposed pistons 57 having inwardly extending stems 58 for engagement by a cam roller 59 on a cammed portion 61 of the pump shaft 41. As the pump shaft 41 revolves, the pistons 57 are reciprocated in timed relationship within the cylinders 56. Each of the cylinders 56 has a port 62 connected through a flexible conduit 63 to a responsive mechanism 64 situated on the engine 6 and having a housing 66 fixed with respect to the cylinder 7. A receiving port 67 in the mechanism 64 opens from the conduit 63 to an interior chamber 68 within which a plunger 69 is reciprocable. A port 71 or plurality of such ports is disposed to be uncovered by the travel of the plunger 69 at an appropriate point of its reciprocation. The plunger is disposed immediately above the rocker arm 72 interposed between the cam shaft 19 and the exhaust valve 18, so that the actuator 72 can respond to the cam 19 or to an excursion of the plunger 69.

With this mechanism, the operation of the piston 57 is such as to cause an actuation of the plunger 69, thus operating the exhaust valve 18 pursuant to the operation of the pump piston 57.

In order to afford operating fluid for the pump and responsive mechanism, the oil pump 14 discharges through a line 81 extending to a pair of branches 82 and 83 leading into a control valve body 84, and lines 86 and 87 extend from the control body to appropriate ports 88 and 89 in the pump body 51, the latter port 89 connecting to the actuated side of the piston 57, while the port 88 connects through a check valve 91 to the side of the piston 57 adjacent the port 62.

The conduit 87 leads through the valve body 84 and into a return line 93 having branches 94 and 96 and extending to a return pipe 97 within the crank case 12. With this mechanism the oil from the crank case is continuously circulated to the valve body 84 and, depending upon the condition of the valve mechanism in the body, is circulated to or relieved from the pump 51.

To afford appropriate control within the valve body 84, there is situated a reciprocable valve spindle 98 having lands 99 and 101 which together with a land 102 control flow between the various ports in the valve body and the various lines, so that in the position of the valve spindle shown in the figure there is pressure fluid flowing from the conduit 83 into the conduit 86 with return flow from the conduit 87 into the conduit 93. In the reverse position of the valve spindle the pressure flow is from the conduit 82 into the conduit 87 and from the conduit 86 into the conduit 93. However, reverse flow of any substantial magnitude from the cylinder 56 is precluded by the check valve 91.

The valve spindle is actuated preferably by making the land 102 magnetically responsive and utilizing it also as the core of a solenoid coil 103, the spindle being influenced in one direction when the coil is energized against the return influence, when the coil is de-energized, of a coil spring 104.

The circuit for the solenoid coil 103 extends from a battery 106 having one terminal provided with a ground 107 through a conductor 108 to the coil 103 and through the coil. The far side of the coil is connected through a conductor 109 to a manual switch 111 having one terminal 112 joined by a lead 113 to a ground 114, thus completing the circuit. An additional terminal 116 is a blank and represents an off position of the circuitry, whereas a third terminal 117 is connected by a lead 118 to a solenoid 119 similar to the solenoid otherwise illustrated but joined to the customary fuel injection rack 121 governing the operation of the injector 16 on the engine. The solenoid 119 is effective when energized to move the fuel injection rack 121 into a position to interrupt the flow of fuel from the injector 16 and thus prevent the engine operating on a power cycle but leaving the engine to "motor" or revolve simply on the intake air. The solenoid 119 is connected in a further branch of the circuitry by a lead 122 having a branch 123 extending to a switch 124 actuated by the brake pedal 28 and connected by a lead 126 to a ground 127. The lead 122 itself extends to another switch 128 actuated by the foot throttle pedal 26 and joined through a conductor 129 to another ground 131.

With the engine in operation, depression of the brake pedal 28 or the lifting of the throttle treadle 26 are both effective to put into operation the hydraulic pump or actuating device which operates the responsive plunger 69 and causes the exhaust valve 18 to open in time with the operation of the engine but at the end of the compression stroke or the beginning of what otherwise would be a power stroke, the injector 16 having simultaneously been deprived of fuel.

In addition to the foregoing mechanism, we particularly provide an arrangement which varies the timing of the operations of the plunger 69.

Within the governor housing 43, there is provided on the pump shaft 41 a hub 134 carrying flyball weights 136. These are mounted on pivots 137 so as to be centrifugally responsive to the speed of rotation of the shaft 41. The flyball weights likewise have lever arms 138 bearing against a disk 139 having a key 141 engaged with a keyway 142 within the housing 43. The disk 139 can be moved axially within the housing 43 but cannot rotate with respect thereto. Since the housing itself is nonrotatable with respect to the general framing 46, axial movement of the disk 139 is used to provide a relative rotation or angular variation of the pump housing itself. For that reason, the disk 139 has a hub with an external helical thread 143 which engages with a comparable thread 144 in the housing 51. Since the housing is already rotatably mounted on the shaft 41 and has flexible connections, the operation of the flyball weights 136 in response to variations in engine speed and particularly to an increase in engine speed causes the disk 139 to translate toward the left in the figure and to provide a rotation of the pump housing 51 with respect to the governor housing. The direction of rotation is such as to advance the timing of the exhaust valve opening as the engine speed increases, thus affording an improved braking effect as the engine speed is greater. A return spring 146 causes a retrograde movement of the disk 139 as the flyball weights 136 recede with engine speed decrease.

In this fashion the automotive vehicle engine brake mechanism has a variable timing to afford appropriate braking through the engine in accordance with the engine and vehicle speed.

What is claimed is:

1. A variably timed brake for an automotive vehicle engine having a crank shaft and a periodically operated poppet exhaust valve comprising a hydraulically responsive expansible device movable between a first position holding said exhaust valve open and a second position out of contact with said exhaust valve, a hydraulic actuating device hydraulically coupled to said responsive device to move said responsive device between said first and said second positions, means for driving said actuating device from said crank shaft, and means for varying said driving means to change the angular relationship of said crank shaft and said actuating device in accordance with the rotational speed of said crank shaft.

2. A variably timed brake as in claim 1 in which said actuating device includes a pump plunger reciprocably mounted in a housing and driven by a shaft coupled to said crank shaft and said means to change the angular relationship includes a centrifugal device arranged to rotate said housing and said shaft relative to each other about the axis of said shaft in addition to the rotation of said shaft by said crank shaft.

3. A variably timed brake as in claim 1 in which said varying means includes a flyball device.

4. A variably timed brake as in claim 2 in which said housing is rotatable about the axis of said shaft and said hydraulic coupling is flexible.

5. A variably timed brake as in claim 1 in which means are provided for interrupting said hydraulic coupling to render said expansible device ineffective.

References Cited

UNITED STATES PATENTS

| | | |
|---|---|---|
| 2,002,196 | 5/1935 | Ucko. |
| 2,785,668 | 3/1957 | Dehmer. |
| 2,958,315 | 11/1960 | Williams. |
| 3,220,392 | 11/1965 | Cummins. |
| 3,254,743 | 6/1966 | Finger. |
| 3,332,405 | 7/1967 | Haviland. |
| 3,367,312 | 2/1968 | Jonsson. |

WENDELL E. BURNS, *Primary Examiner.*

U.S. Cl. X.R.

123—90; 180—82